G. S. MATTHEWS.
DEVICE FOR INDICATING THE INTENDED MOVEMENTS OF VEHICLES.
APPLICATION FILED NOV. 29, 1910.
1,017,226.
Patented Feb. 13, 1912.
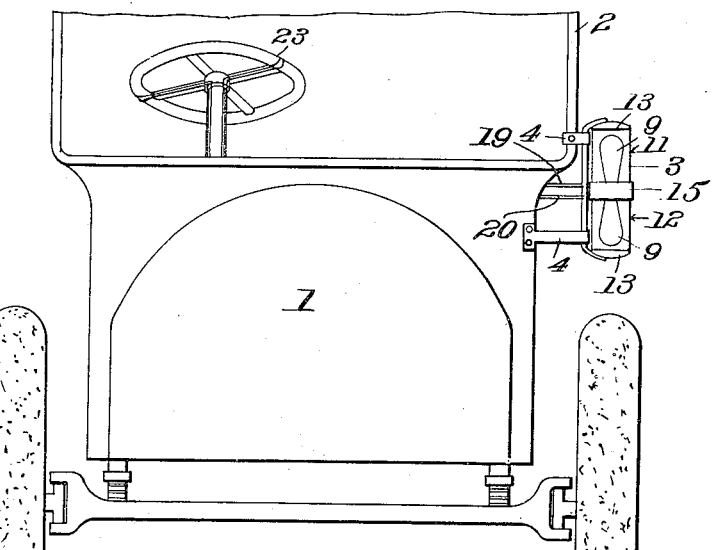
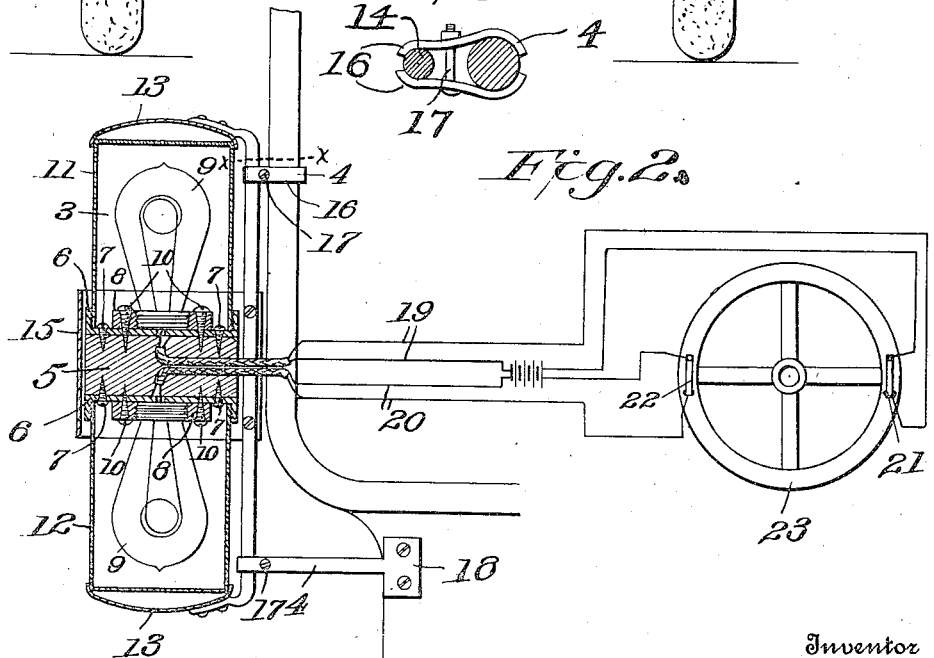

UNITED STATES PATENT OFFICE.

GEORGE S. MATTHEWS, OF KANSAS CITY, MISSOURI.

DEVICE FOR INDICATING THE INTENDED MOVEMENTS OF VEHICLES.

1,017,226.        Specification of Letters Patent.        Patented Feb. 13, 1912.

Application filed November 29, 1910. Serial No. 594,786.

*To all whom it may concern:*

Be it known that I, GEORGE S. MATTHEWS, a citizen of the United States, residing at Kansas City, in the county of Jackson and State of Missouri, have invented certain new and useful Improvements in Devices for Indicating the Intended Movements of Vehicles; and I do hereby declare the following to be a full, clear, and exact description of the invention, such as will enable others skilled in the art to which it appertains to make and use the same.

My invention relates to a device for indicating the intended movements of vehicles.

Accidents due to collisions with automobiles, owing to the rapidly increasing numbers of these vehicles upon the streets and the swiftness with which they move, are becoming so frequent that some means for preventing them is a practical necessity. If all automobiles in a given locality were to adopt a uniform system of signals indicating in which direction they intend to turn and when they expect to stop, a large proportion of these accidents would be averted.

It is the object of my invention to provide a signaling device of simple construction which can be attached to automobiles and maintained at a small expense.

My invention consists of an indicator or holder adapted to be attached to the forward part of an automobile and containing two electric bulbs arranged interiorly of globes of differently colored glass, said electric bulbs being separately controlled by means of two switches preferably located on the steering wheel of the car. The idea is to illuminate one of the electric bulbs, by means of its switch, to indicate that the vehicle intends to turn to the right, to illuminate the other electric bulb, by means of the other switch, to indicate that the vehicle intends to turn to the left, and to illuminate both electric bulbs, by pressing both switches, when the vehicle is to stop. In this way the drivers of other vehicles, and pedestrians will know in advance the intended movements of an automobile equipped with my signaling apparatus, and a great many accidents will consequently be avoided.

While my invention is especially designed for use on automobiles, it may also be utilized to advantage on other vehicles.

The invention also consists in the features of construction and combinations of parts hereinafter described, illustrated in the accompanying drawing, and specified in the appended claims.

In the accompanying drawing: Figure 1 is a front elevation of an automobile showing my signaling device attached thereto, Fig. 2 is a diagrammatic view of the indicator, the steering wheel, the switches for controlling the lights, and the wiring connecting said switches and the electric bulbs, and Fig. 3 is an enlarged sectional view on the line $x$—$x$ of Fig. 2.

Referring more particularly to the drawing, 1 designates an automobile of a usual type and to the wind guard of which my indicator or holder 3 is secured by means of suitable clamps 4. The holder is generally cylindrical in form and is preferably mounted in an upright position, as shown. Said holder contains a central block 5, preferably of wood, to the upper and lower faces of which are secured flanged plates 6, by means of screws 7. In the center of each of these plates there is secured a socket 8, for the incandescent electric bulbs 9, by means of other screws 10. Cylindrical glass globes 11 and 12, respectively, are fitted within the flanges of the plates 6 and inclose the respective bulbs. The outer ends of the globes are seated in concave caps 13 rigidly secured to the opposite extremities of a rod 14 extending longitudinally of the indicator at the side thereof. Said rod is also fastened to a metal band 15 passed around the wooden block 5 and projecting beyond and protecting the joints between the globes and the flanged plates 6. The clamps or brackets 4, which may be of any desired and suitable construction, are attached to the rod 14. As illustrated, each of these brackets consists of two clamp members 16 secured together by a set-screw 17.

While I have shown the indicator attached to the wind guard, it will be understood that it may be secured to any other prominent part of the front of the automobile where it will be in unobstructed view from the front of the car, I have provided the lower clamp 4 with a plate 18 which is screwed or riveted to the rigid front of the vehicle below the wind guard, but this particular form of bracket is not essential.

Globes of any desired colors may be used on the indicator. I have adapted yellow for the upper globe 11 and green for the lower globe 12. Separate pairs of wires 19 and 20 run from the bulbs to the switches 21 and 22 on the steering wheel 23. These switches are preferably located at diametrically opposite points on the steering wheel so that they can be conveniently pressed by the corresponding hands of the driver. For instance, the switch 21, controlling the bulb in the yellow globe 11, the illumination of which will indicate an intended turn to the right, is located on that portion of the steering wheel which is naturally grasped by the right hand of the operator when the vehicle is headed in a forward direction. The switch 22, which is connected to the bulb in the green globe 12, is consequently located at a point on the steering wheel diametrically opposite from the switch 21 and where the wheel is usually grasped by the left hand of the operator. The illumination of the bulb in the green globe, by pressing the switch 22, will, according to my plan, indicate an intended turn to the left. The pressing of both switches, causing the illumination of both bulbs at the same time, will indicate that the vehicle is going to stop.

I claim:

1. An indicator of the character described comprising a central block, differently colored globes attached to the opposite ends of said block, caps fitted over the outer ends of said globes, a longitudinally extending rod secured to said caps, a protecting band passed around said block and projecting beyond the joints between said globes and block, said band being also connected to the longitudinal rod, electric bulbs in said globes, means to support the indicator upon a vehicle, and means to illuminate said bulbs either separately or at the same time.

2. An indicator of the character described comprising a central block, flanged plates secured to the opposite ends thereof, differently colored globes fitted within said flanged plates, caps fitted over the outer ends of said globes, a longitudinally extending rod secured to said caps, means for fastening the rod to a vehicle, electric bulbs mounted in said globes, and means to illuminate said bulbs either separately or at the same time.

3. An indicator of the character described comprising a central block, flanged plates secured to the opposite ends thereof, differently colored globes fitted within said flanged plates, caps fitted over the outer ends of said globes, a longitudinally extending rod secured to said caps, a band passed around said block and secured to said rod, said band projecting beyond the points between the globes and the flanged plates, for the purpose specified, means for fastening the indicator to a vehicle, electric bulbs mounted in said globes, and means to illuminate said bulbs either separately or at the same time.

4. An indicator of the character described comprising a central block, differently colored globes attached to the opposite ends of said block, a longitudinally extending rod, means attached to said rod for retaining the globes in position, means for fastening the indicator to a vehicle, electric bulbs mounted in said globes, and means to separately illuminate said bulbs.

5. An indicator of the character described comprising a central block, differently colored globes attached to the opposite ends of said block, a longitudinally extending rod, caps fitted over the outer ends of said globes and secured to said rod, means for fastening the indicator to a vehicle, electric bulbs mounted in said globes, and means to separately illuminate said bulbs.

6. An indicator of the character described comprising a central block, differently colored globes attached to the opposite ends of said block, a longitudinally extending rod, means attached to said rod for retaining the globes in proper position, a band passed around said block and attached to said rod, said band projecting beyond the joints between the globes and the block for the purpose specified, means for fastening the indicator to a vehicle, electric bulbs mounted in said globes, and means to separately illuminate said bulbs.

In testimony whereof, I affix my signature, in presence of two witnesses.

GEO. S. MATTHEWS.

Witnesses:
ARCHIE N. JOHNSON,
J. R. HALL.